United States Patent [19]
Nichols et al.

[11] Patent Number: 6,031,065
[45] Date of Patent: Feb. 29, 2000

[54] POLYESTER COPOLYMERS FROM NAPHTHALATE AND RELATED ESTERS

[75] Inventors: Carl S. Nichols, Waxhaw, N.C.; Robert Adrian Ellis; James Scott Thomas, both of Florence, S.C.

[73] Assignee: Wellman, Inc., Shrewsbury, N.J.

[21] Appl. No.: 09/017,514

[22] Filed: Feb. 2, 1998

Related U.S. Application Data

[63] Continuation-in-part of application No. 08/672,578, Jun. 28, 1996, Pat. No. 5,817,910.

[51] Int. Cl.$^7$ ................................................... C08G 63/00
[52] U.S. Cl. ........................ 528/271; 528/272; 528/305; 526/67; 526/68; 526/70; 526/71
[58] Field of Search ................................. 528/271, 272, 528/305; 526/71, 67, 68, 70

[56] References Cited

U.S. PATENT DOCUMENTS

| | | |
|---|---|---|
| T104,901 | 12/1894 | Cox et al. . |
| 4,066,627 | 1/1978 | Borman et al. .......................... 528/279 |
| 4,146,729 | 3/1979 | Goodley . |
| 4,285,881 | 8/1981 | Yang . |
| 4,950,309 | 8/1990 | Schulz . |
| 5,393,916 | 2/1995 | Gamble, et al. . |

FOREIGN PATENT DOCUMENTS

| | | |
|---|---|---|
| 0498509 | 8/1992 | European Pat. Off. . |
| 3841858 | 10/1989 | Germany . |
| 73-043510 | 5/1973 | Japan . |
| 74-027587 | 7/1974 | Japan . |
| 55-164679 | 12/1980 | Japan . |
| 61-085436 | 5/1986 | Japan . |
| 5-103844 | 4/1993 | Japan . |
| 256780 | 3/1970 | Russian Federation . |
| WO88/00610 | 1/1988 | WIPO . |

OTHER PUBLICATIONS

Morse, Paige M., "PEN: The New Polyester"; Chemical Engineering News, Vol. 75, No. 45, Nov. 10, 1997, pp. 8–9.
Sudnick, John J.; "A Happy Ending in the Fight Against HAPS," Environmental Protection; Apr. 1996, pp–40–41.
Marks, Charles H.; "Using Hazardous Liquid Wastes as Fuel"; Plant Engineering, Oct. 8, 1987; pp. 55–57.
Rolke, et al., Afterburner Systems Study sponsored by the Environmental Protection Agency, Office of Air Programs, Research Tiangle Park, NC, Report No. EPA–R2–72–062, Chapter 5 (Aug. 1972).
Air Pollution Engineering Manual (Ed. John A. Danielson), published by the Environmental Protection Agency and the Office of Air Quality Planning and Standards, Research Triangle Park, NC, May 1973, pp. 183–184.
Joseph, G.T., et al., "APT 1 Course 415 –Control of Gaseous Emissions" (Student Manual), published by the Environmental Protection Agency and Air Pollution Training Insitute of the Research Triangle Park, NC, Dec. 1981, pp. 3–30 to 3–31.
Popoola, A.V.; "Mechanism of hte Reaction Involving the Formation of Dioxane Byproduct During the Production of Poly(ethylene Terephthalate";Journal of Applied Polymer Science 43, 1997, pp. 1875–1877.

*Primary Examiner*—Terressa Mosley
*Attorney, Agent, or Firm*—Philip Summa

[57] ABSTRACT

A method is disclosed of producing a copolymer of polyethylene terephthalate and polyethylene naphthalate. The method comprises esterifying a combination of a diester of naphthalene, terephthalic acid, and ethylene glycol to produce an esterification reaction mixture that includes the alcohol byproduct of the naphthalene diester, distilling the reaction mixture to remove at least a portion of the esterification byproducts from the reaction mixture in the form of a vapor stream of which the majority component is water vapor and which includes the alcohol byproduct of the naphthalate ester in the vapor state, and combusting at least a portion of the vapor stream under conditions sufficient to decompose at least a portion of the alcohol byproduct present in the vapor stream.

18 Claims, 1 Drawing Sheet

POLYESTER COPOLYMERS FROM NAPHTHALATE AND RELATED ESTERS

The present invention is a continuation-in-part of copending application Ser. No. 08/672,578 filed Jun. 28, 1996, now U.S. Pat. No. 5,817,910.

FIELD OF THE INVENTION

The invention relates to the manufacture of polyesters, and in particular relates to the manufacture of a copolymer of polyethylene terephthalate and polyethylene naphthalate.

BACKGROUND OF THE INVENTION

The present invention relates to the production of copolymers of polyethylene naphthalate ("PEN") and polyethylene terephthalate ("PET"). Polyethylene naphthalate incorporates naphthalene's double aromatic ring structure which gives it certain enhanced characteristics as compared to polyethylene terephthalate which incorporates benzene's single-ring structure. In particular, the increased rigidity of the double-ring structure gives polyethylene naphthalate higher strength, greater heat stability, and improved barrier properties compared to other polyesters.

For these and other reasons polyethylene naphthalate is a particularly strong candidate for packaging materials. Polyethylene naphthalate has a higher glass transition temperature and a reduced gas permeability as compared to polyethylene terephthalate.

As an alternative to pure PEN, blends and copolymers of polyethylene terephthalate and polyethylene naphthalate offer packaging advantages over polyethylene terephthalate standing alone. In this regard, the oxygen-sensitivity and required packaging temperatures of particular foods tend to define the melt temperature and oxygen permeability of the packaging materials that can be used with those foods. Thus, polyethylene terephthalate can withstand packaging temperatures up to about 180° F. and offers oxygen permeability as low as 5 grams per milliliter per atmosphere per day. By comparison, polyethylene naphthalate can withstand process temperatures of up to about 250° F. and, for foods sensitive to oxygen exposure, its oxygen permeability approaches 0.5 grams per milliliter per atmosphere per day.

As a result, blends and copolymers of polyethylene terephthalate and polyethylene naphthalate can offer a number of the advantages of PEN, but at a lower cost than pure PEN (present pricing of raw materials, cost is a current disadvantage in the use of pure polyethylene naphthalate). Blends and copolymers of polyethylene terephthalate and polyethylene naphthalate can withstand packaging temperatures of 200–210° F., and both offer lower oxygen permeability as compared to polyethylene terephthalate. For example, the copolymers offer oxygen permeability of about 4 grams per milliliter per atmosphere per day, while the blends offer oxygen permeability as low as about 1 gram per milliliter per atmosphere per day. As a result, items such as jellies, sports drinks, and tomato sauces that must be packaged at temperatures higher than polyethylene terephthalate can withstand can be packaged in PET-PEN copolymers. Other items requiring lower oxygen permeability than PET can offer, such as catsup and certain carbonated soft drinks, can be successfully packaged in the PET-PEN blends.

As known to those familiar with polyester and its method of manufacture, most polyethylene terephthalate is currently made in the "direct esterification" process. In the initial step, terephthalic acid and ethylene glycol undergo an esterification reaction to form an ester, with water as a byproduct. A corresponding direct esterification can be carried out using diacids of naphthalene. As a present disadvantage, however, the diacids of naphthalene tend to be somewhat less pure than terephthalic acid, and the impurities have undesired side effects on the reaction and the equipment used to carry it out.

The naphthalene diesters, however, are available in higher purity than their corresponding acids. The esters thus offer an attractive starting material for polyethylene naphthalate polymers and copolymers.

The esters nevertheless raise a disadvantage in that they produce alcohols, rather than water, as their byproduct in the initial esterification reaction. Because terephthalic acid produces water as its byproduct, many current facilities for polyester manufacture are well equipped to handle water as the byproduct. These facilities are not, however, as well equipped—or indeed not equipped at all—to handle alcohol byproducts. As those of ordinary skill in this art recognize, although some characteristics of water and lower alcohols are similar in the liquid and vapor phases, other characteristics are quite different. As a result, alcohols either should not or cannot be disposed of using all of the identical equipment or techniques that can be used to dispose of water.

In copending application Ser. No. 08/672,578, filed Jun. 28, 1996, for "Destroying 1,4-Dioxane in Byproduct Streams Formed During Polyester Synthesis," and now U.S. Pat. No. 5,817,910, which is commonly assigned with the present invention, a technique is disclosed in which the reaction mixture of the esterification of the polyester precursors (dihydroxyl alcohol and dicarboxylic acid) are distilled to remove at least a portion of the esterification byproducts from the reaction mixture in the form of a vapor stream. Although the majority component of the vapor stream tends to be water, it also contains other undesired byproducts that need to be disposed of properly.

The '578 application focused on dioxane removal and disclosed that sending the vapor stream to a combustion burner (rather than condensing it as in conventional processes), easily destroyed the dioxane before it was ever emitted as a byproduct or pollutant. The addition of the water vapor to the combustion burner lowers its efficiency somewhat, of course, but the production advantages gained by destroying the dioxane generally outweigh the small loss of efficiency suffered by the burner when the water vapor is added.

OBJECT AND SUMMARY OF THE INVENTION

Accordingly, it is an object of the present invention to provide a technique for disposing of the alcohol byproducts produced when naphthalate esters are used in esterification reactions rather than naphthalate acids.

The invention meets this object with a method of producing a copolymer of polyethylene terephthalate and polyethylene naphthalate. The method comprises esterifying a combination of a diester of naphthalene, terephthalic acid, and ethylene glycol to produce an esterification reaction mixture that includes the alcohol byproduct of the naphthalene diester; distilling the reaction mixture to remove at least a portion of the esterification byproducts from the reaction mixture in the form of a vapor stream of which the majority component is water vapor and which includes the alcohol byproduct of the naphthalate ester in the vapor state; and combusting at least a portion of the vapor stream under conditions sufficient to decompose at least a portion of the alcohol byproduct present in the vapor stream.

The foregoing and other objects and advantages of the invention and the manner in which the same are accomplished will become clearer based on the following detailed description taken in conjunction with the accompanying drawings in which:

DETAILED DESCRIPTION

Figure 1:
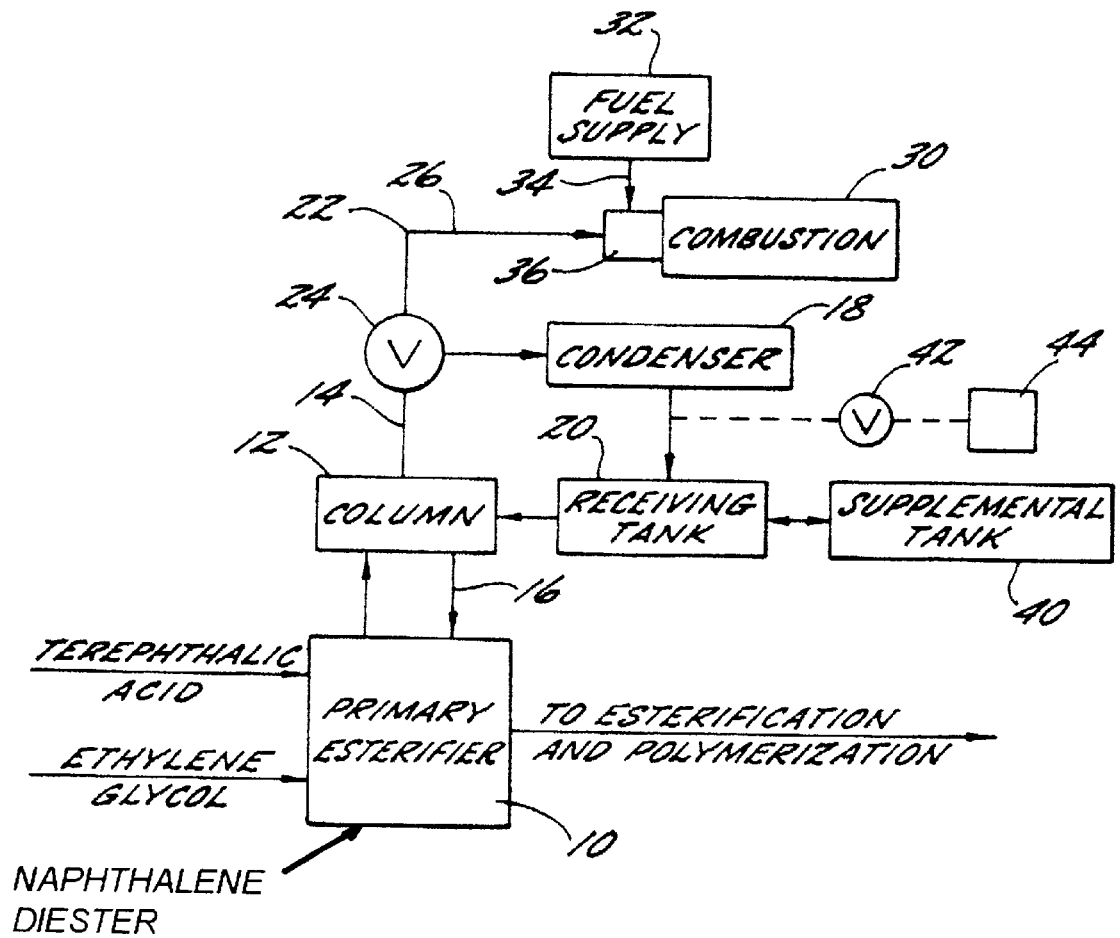
FIG. 1 is a schematic diagram of an apparatus for practicing the method of the invention.

The present invention is a method of producing a copolymer of polyethylene terephthalate and polyethylene naphthalate. The method comprises esterifying a combination of a diester of naphthalene, terephthalic acid, and ethylene glycol to produce an esterification reaction mixture that includes the alcohol byproduct of the naphthalene diester. The reaction mixture is thereafter distilled to remove at least a portion of the esterification byproducts from the reaction mixture in the form of a vapor stream of which the majority component is water vapor and which includes the vaporized alcohol byproduct of the naphthalene diester. At least a portion of the vapor stream is then combusted under conditions sufficient to decompose at least a portion of the vaporized alcohol byproduct present in the vapor stream.

Those familiar with this art will recognize that in prior art processes, the vapor phase of the distilling step is typically recondensed for later disposal. Such a condensation step presents various problems when the distillate contains substances that must be disposed of in subsequent steps, particularly substances that are regulated for emission or pollution control purposes. These subsequent steps add engineering and related cost factors to the overall process.

In contrast, in the present invention the vapor phase is preferably directed to a combustion chamber where it is burned under conditions sufficient to decompose at least a portion of the alcohol byproduct present in the vapor stream. In this manner compounds such as dioxane which are typically regulated from an emission control stand point, or lower alcohols, which may not be regulated but which would otherwise cause further problems in the overall process, are reduced to carbon dioxide and water vapor, which can usually be emitted without major technical or regulatory concern.

In order to take advantage of the combustion step, the naphthalate diester is selected to produce an appropriate alcohol byproduct that has a volatility comparable to or greater than that of water. There are several ways of expressing this selection. As a first, the naphthalene diester can be selected on the basis of being one that will produce an alcohol byproduct that is selected form the group consisting of methanol ($CH_3OH$, b.p. 64.5° C.), ethanol ($CH_3CH_2OH$; b.p. 64.5° C.), propanol ($CH_3CH_2CH_3OH$; b.p. 78.3° C.), and isopropanol ($CH_3CHOHCH_3$; 82.5° C.), all of which have boiling points less than that of water and thus the appropriate volatility. Other possible alcohol byproducts that define qualifying naphthalene diesters, include secondary butanol ($CH_3CH_2CHOHCH_3$; b.p. 99.5° C.) and tertbutanol (($CH_3)_3COH$; b.p. 83° C.). Naphthalene diesters that produce isobutenal (($CH_3)_2CHCH_2OH$; b.p. 108° C.) and tertpentanol ($CH_3CH_2C(OH)(CH_3)_2$; b.p. 102° C.) are also candidates although their boiling points slightly exceed that of water at atmospheric pressure.

Stated in a second fashion, the method can comprise esterifying a combination in which the ester groups of the naphthalene diester are selected from the group consisting of methyl, ethyl, propyl, isopropyl, isobutyl, secondary butyl, tertbutyl, and tertpentyl esters.

Because the double ring structure of the naphthalene molecule forms the backbone of the naphthalene portion of the copolymer, the esters are preferably substituted on the two (2) and six (6) positions on the naphthalene molecule. Thus, a third manner of defining and selecting an appropriate ester is to choose one from the group consisting of 2,6-dimethyl naphthalate, 2,6-diethyl naphthalate, 2,6-dipropyl naphthalate, 2,6-diisopropyl naphthalate, 2,6-diisobutyl naphthalate, 2,6-disecondary butyl naphthalate, 2,6-ditertbutyl naphthalate, and 2,6-ditertpentyl naphthalate.

In preferred embodiments, the naphthalene diester is present in an amount up to about ten (10) mole percent based on the amount of terephthalic acid. Thus in the preferred embodiments, the amount of naphthalene diester in the combination is such that the alcohol byproduct it produces is less than about 10 percent of the vapor stream which also provides the advantage of keeping the resulting mixture of water vapor and alcohol at a combination that is efficiently combustible but not dangerously explosive. It will be understood of course that in accordance with the ideal gas law, at identical temperatures and pressures equal volumes of gas represent equal molar amounts. Thus, the alcohol byproduct can be expressed as representing 10 percent of the vapor stream by either volume or mole fraction.

As yet another way of expressing the qualification, the method can comprise esterifying a combination of the dimethyl ester of the selected 2,6-naphthalene dicarboxylic acid, terephthalic acid, and ethylene glycol.

Accordingly, the distilling step comprises distilling the reaction mixture to form a vapor stream that includes water and the corresponding alcohol from the naphthalene diester. As an example, when 2,6-dimethyl naphthalate is the preferred ester, the vapor steam will include water and methanol, and it will likewise be understood that the vapor stream can correspondingly include proponal, isoproponal, ethanol, or any of the other alcohols listed above based on the initial starting naphthalene ester.

The combustion step is preferably carried out at conditions sufficient to completely decompose the alcohol byproduct in the vapor stream, and preferably to carry out the decomposition under stoichiometric conditions that decompose the alcohol into carbon dioxide and water vapor.

It will be understood, of course, that although combustion of the vapor stream is the most efficient disposal method, the vaporized mixture of alcohol and water could be recondensed for disposal as a liquid, potentially including directing the condensed liquid stream to a burner for combustion. Similarly, although the method of the invention is particularly suitable for producing a terephthalate-naphthalate copolymer, the method can also be used to produce copolymers of terephthalic acid by starting with the diesters of such other dicarboxylic acids.

FIG. 1 schematically illustrates the apparatus useful for carrying out the process. The equipment and its operation are thoroughly described in parent application Ser. No. 08/672,578 and is incorporated herein by reference. As a brief summary, however, FIG. 1 illustrates that terephthalic acid, ethylene glycol and the naphthalene ester are initially directed to the primary esterifier 10 to form the initial reaction mixture, a portion of which later continues to the secondary esterifier and the polymerizers (not shown) typical of current polyester manufacturing facilities.

A vapor phase is preferably continually removed from the primary esterifier into a distillation column 12 from which the vapor stream 14 is removed. A valve 24 directs the vapor phase composed primarily of water vapor and the alcohol byproduct through appropriate piping 22 and 26 to the combustion chamber 30. As FIG. 1 illustrates, the combustion chamber includes a fuel supply 32, and an appropriate delivery system 34 from the fuel supply 32 to the appropriate burner 36.

FIG. 1 also illustrates the various relationships among the condenser 18, the receiving tank 20, a supplemental condenser receiving tank 40, a valve 42 and a water supply 44 (for cooling purposes), the operation of which is described as set forth earlier in the parent '578 application.

The invention accordingly provides an efficient method of eliminating both the hazardous byproducts such as dioxane (as highlighted in the '578 application), as well as substances such as the alcohols described herein which, although less hazardous or nonhazardous, present certain engineering problems that add complexity and costs to the use of polyethylene naphthalate. The invention thus provides a significantly improved technique for obtaining naphthalate copolymers while avoiding both the purity problems with naphthalate diacids and the engineering problems presented by the byproducts of naphthalene diesters.

In the drawings and specification, there have been disclosed typical embodiments of the invention, and, although specific terms have been employed, they have been used in a generic and descriptive sense only and not for purposes of limitation, the scope of the invention being set forth in the following claims.

That which is claimed is:

1. A method of producing a polyester copolymer from terephthalic acid and a second dicarboxylic acid, the method comprising:

esterifying a combination of, terephthalic acid, a diester, other than dimethyl terephthalate, of a second dicarboxylic acid, other than terephthalic acid, and ethylene glycol to produce an esterification reaction mixture that includes the alcohol byproduct of the diester of the second dicarboxylic acid;

distilling the reaction mixture to remove at least a portion of the esterification byproducts from the reaction mixture in the form of a vapor stream of which the majority component is water vapor and which includes the alcohol byproduct of the non-terephthalate diester in the vapor state; and disposing of the vapor stream by combusting at least a portion of the vapor stream under conditions sufficient to decompose at least a portion of the alcohol byproduct present in the overhead vapor stream.

2. A method according to claim 1 wherein the step of disposing the vapor stream comprises condensing the vapor stream and disposing of the resulting liquid.

3. A method according to claim 1 wherein the esterifying step comprises esterifying a diester of naphthalene dicarboxylic acid.

4. A method according to claim 1 wherein the diester of the second carboxylic acid is one for which the alcohol byproduct has a volatility comparable to or greater than that of water.

5. A method according to claim 4 wherein the ester groups of the diester are selected from the group consisting of methyl, ethyl, propyl, isopropyl, isobutyl, secondary butyl, tertbutyl, and tertpentyl.

6. A method according to claim 1 wherein the step of esterifying the combination comprises esterifying a combination with a diester that produces an alcohol byproduct selected from the group consisting of methanol, ethanol, propanol, isopropanol, secondary butanol, tertbutanol, isobutenal, and tertpentanol.

7. A method of producing a copolymer of polyethylene terephthalate and polyethylene naphthalate the method comprising:

esterifying a combination of a diester of a naphthalene dicarboxylic acid, terephthalic acid, and ethylene glycol to produce an esterification reaction mixture that includes the alcohol byproduct of the naphthalene diester;

distilling the reaction mixture to remove at least a portion of the esterification byproducts from the reaction mixture in the form of a vapor stream of which the majority component is water vapor and which includes the alcohol byproduct of the naphthalate ester in the vapor state; and combusting at least a portion of the vapor stream under conditions sufficient to decompose at least a portion of the alcohol byproduct present in the overhead vapor stream.

8. A method according to claim 7 comprising esterifying a combination of the dimethyl ester of 2,6-naphthalene dicarboxylic acid, terephthalic acid and ethylene glycol.

9. A method according to claim 8 comprising distilling the reaction mixture to form a vapor stream that includes water and methanol.

10. A method according to claim 7 comprising combusting the portion of the vapor stream under conditions sufficient to decompose the alcohol byproduct in the vapor stream.

11. A method according to claim 10 wherein the combustion conditions are sufficient to decompose the alcohol byproduct in the vapor stream into carbon dioxide and water vapor.

12. A method according to claim 7 wherein the combustion temperature is between about 1500° F. and 3500° F.

13. A method according to claim 7 wherein the naphthalene diester is present in an amount up to about ten mole percent based on the amount of terephthalic acid.

14. A method according to claim 7 in which the amount of naphthalene diester in the combination is such that the alcohol byproduct it produces is less than about 10% of the vapor stream.

15. A method according to claim 7 wherein the naphthalene diester is one for which the alcohol byproduct has a volatility comparable to or greater than that of water.

16. A method according to claim 15 wherein the ester groups of the naphthalene diester are selected from the group consisting of methyl, ethyl, propyl, isopropyl, isobutyl, secondary butyl, tertbutyl, and tertpentyl.

17. A method according to claim 7 wherein the naphthalene disester is selected from the group consisting of 2,6-dimethylnaphthalate, 2,6-diethylnaphthalate, 2,6-dipropylnaphthalate, 2,6-diisopropylnaphthalate, 2,6-diisobutyl naphthalate, 2,6-disecondary butyl naphthalate, 2,6-ditertbutyl, naphthalate and 2,6-ditertpentyl naphthalate.

18. A method according to claim 7 wherein the step of esterifying the combination comprises esterifying a combination with a naphthalene diester that produces an alcohol byproduct selected from the group consisting of methanol, ethanol, propanol, isopropanol secondary butanol, tertbutanol, isobutenal, and tertpentanol.

* * * * *